Inventor:
C. A. H. Mulder,

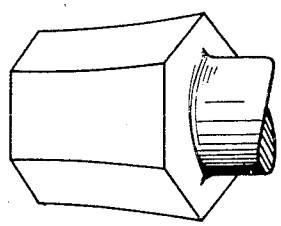
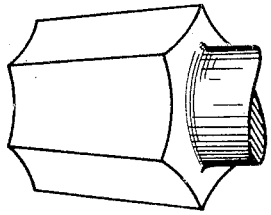
Fig. 16.    Fig. 17.
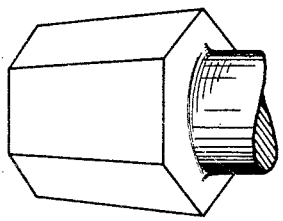
Fig. 18.
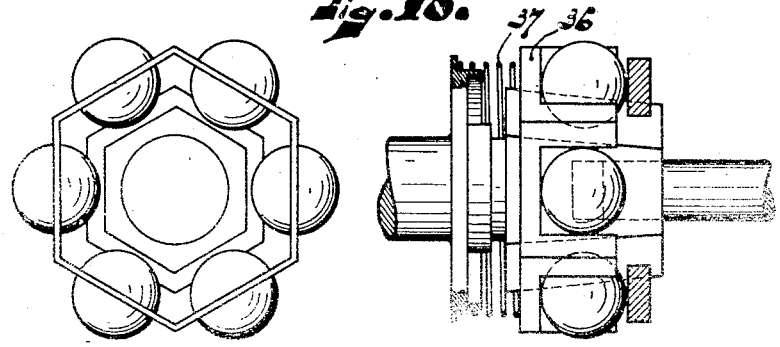
Fig. 20.    Fig. 19.
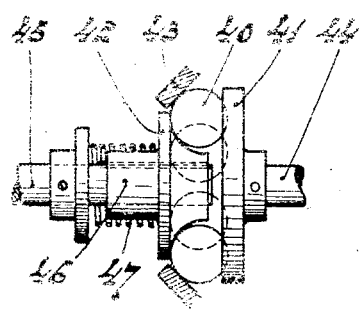
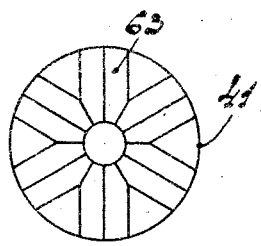
Fig. 21.    Fig. 22.
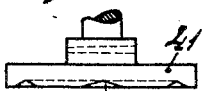
Fig. 23.

Feb. 14, 1933. C. A. H. MULDER 1,897,436
TRANSMISSION BETWEEN TWO SHAFTS WITH REGULABLE GEAR RATIO
Filed Aug. 4, 1930 4 Sheets-Sheet 4

Inventor:
C. A. H. Mulder,
by Langner, Perry, Card & Langner
Att'ys.

Patented Feb. 14, 1933

1,897,436

UNITED STATES PATENT OFFICE

CORNELIS ANDRIES HEERO MULDER, OF EINDHOVEN, NETHERLANDS, ASSIGNOR TO N. V. PHILIPS' GLOEILAMPENFABRIEKEN, OF EINDHOVEN, NETHERLANDS

TRANSMISSION BETWEEN TWO SHAFTS WITH REGULABLE GEAR RATIO

Application filed August 4, 1930, Serial No. 472,915, and in the Netherlands September 25, 1929.

It is known to effect the transmission of motion in a transmission between two shafts, by means of intermediate solids of revolution which are in contact with a plurality of surfaces of revolution of which usually at least one is connected with the primary and one with the secondary shaft, another surface being stationary. The movement of the surface connected with the primary shaft causes a rolling of the intermediate bodies about axes of rotation passing through their points of contact with the stationary surface, due to which forces are exerted on the secondary surface at their points of contact with this surface. The distances between the primary and secondary points of contact and the said axes of rotation together with the ratio of the diameter of the ball-races determine the gear-ratio. These magnitudes and consequently the gear-ratio may be altered by modifying the position of the surfaces relative to one another.

The present invention comprises causing the convergence of at least two of the surfaces with which each intermediate solid of revolution cooperates, such convergence taking place in the direction in which the solid is driven by rotation of the primary shaft. Due to this the great advantage is obtained that the intermediate bodies fix themselves as it were between the surfaces, so that no special devices are required for ensuring a sufficient pressure against the primary, secondary and a third surface, for example, a stationary one, which may be adjustable. The intermediate solid of revolution may have any desired shape. It is advisable, however, to give it the shape of a sphere.

According to one embodiment of the invention each intermediate body is in contact with two surfaces of rotation and a surface converging with at least one of said surfaces according to the direction of its relative movement. Said surface will be denoted hereinafter by the term "clamping surface". This clamping surface may be flat or curved. However, it must not be a surface of revolution arranged concentrically with the other surfaces of revolution.

In this form of construction each intermediate solid will perform a rolling-movement over the surfaces of revolution and will turn about an axis occupying a permanent position relative to the clamping surface. The transmission according to the invention may be so constructed that the ratio of the tangential and normal forces in the contacting points may be altered by adjusting the surfaces cooperating with the intermediate solids. In this case it may be so adjusted that this ratio is always somewhat smaller than the coefficient of friction, due to which on the one hand unduly high pressure and on the other hand slipping is avoided. This adjustment may be effected by displacing the surfaces in an axial direction relative to one another, and furthermore by giving them an angular displacement relative to one another.

A great advantage of the transmission according to the invention consists in that the normal pressure exerted by the intermediate solids on the surfaces depends on the load of the secondary shaft, in contradistinction to the known constructions above referred to in which the normal pressure depends on an external pressure exerted either by a spring or hydraulically or in any other convenient manner on the bodies cooperating with the intermediate solids. In the last mentioned devices the normal pressures exerted by the intermediate solids on the surfaces are independent of the load of the secondary shaft, so that to avoid slipping, said pressures must be so chosen that they are sufficient for the largest load for which the transmission is constructed. If this transmission is used for lighter loads then the normal pressure remains the same, so that it is exceedingly high and results in low efficiency and undue wear. This is not the case in the transmission according to the invention, in which the normal pressures increase or decrease with the load of the secondary shaft. By this property an automatic adjustment of the gear-ratio upon variation in load is made possible. To this end at least one surface is movably arranged relative to the other surfaces in such manner that the adjustment of this surface depends on the one hand on an external force, and on the other hand on the forces exerted by the intermediate solid on the surface. By the term "external force" is meant that force which is independent of the forces exerted by the surfaces and the intermediate solids on each other. This external force may be excited, for example, by a spring or hydraulically or in any other suitable manner.

The surfaces may be so constructed that the ratio between the normal pressures exerted on the surfaces of revolution always corresponds substantially to the ratio of the tangential forces, which, of course contributes materially to the efficiency.

In order that the transmission may be used in a wide range of applications, according to the invention a coupling device may be provided by which it is rendered possible to couple at will at least one of the surfaces, cooperating with an intermediate solid, with either the primary or secondary shaft, or with a stationary body, or again with a body which is independently movable relative to these shafts. The coupling with the shafts may be effected either directly or with the interposition of a gearing. In the latter case the transmission is a differential transmission by which an infinite variation in gear-ratio is rendered possible. The term "independently movable" referred to above is intended to denote a movability of the surface which is not derived from the shaft. The movement of the surface need not necessarily be regular, since it may also be irregular, for example, intermittently accelerated and so forth.

According to one form of construction the coupling of one of the surfaces, by means of which an intermediate body cooperates with the primary or secondary shaft or with a non-rotary element, is a friction coupling, in which the required pressure is derived from the forces exerted by the intermediate bodies on said surface.

In order to render the transmission exceedingly sensitive towards very small displacements of the surfaces, which may be very advantageous for an automatic adjustment, the generatrix of one of the surfaces of revolution is given a generatrix formed by a curve whose curvature differs but slightly from that of the surface of the intermediate solid cooperating therewith.

In order to avoid escape of the intermediate solids from the clamping position between the surfaces, whereby they would no longer participate in the transmission of motion, due to which the efficiency would be unfavorably influenced and rotation even be rendered impossible, they may be housed in a cage which follows them in their movement about the shaft of the transmission and prevents one of them from lagging too far behind the other.

According to one embodiment at least one of the surfaces is self-adjusting. When using a plurality of interediate solids this self-adjustment has proved to be useful since in consequence thereof the forces exerted on the different bodies are formed to have a greater uniformity relative to one another.

The invention will be more clearly understood by reference to the accompanying drawings.

Figs. 4-15 inclusive are schematic views of various types of devices according to my invention and in which are illustrated in detail the mechanical construction of the device;

Figs. 16 through 18 show in perspective several forms of the conical member;

Figs. 19 and 20 show respectively in side elevation and in end view a modified form of construction;

Figs. 21 through 23 show a still further modification; and

Figures 24, 25:
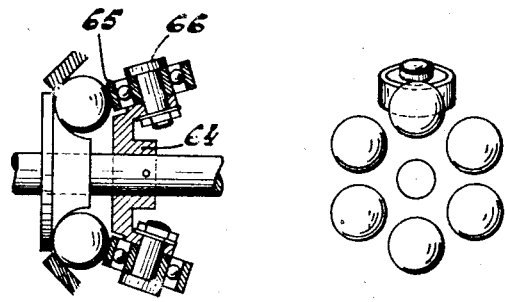

Figs. 24 and 25 illustrate in transverse section and in elevation respectively, a form of my invention wherein the ball-bearings and pins rotate without appreciable friction.

Figure 26:
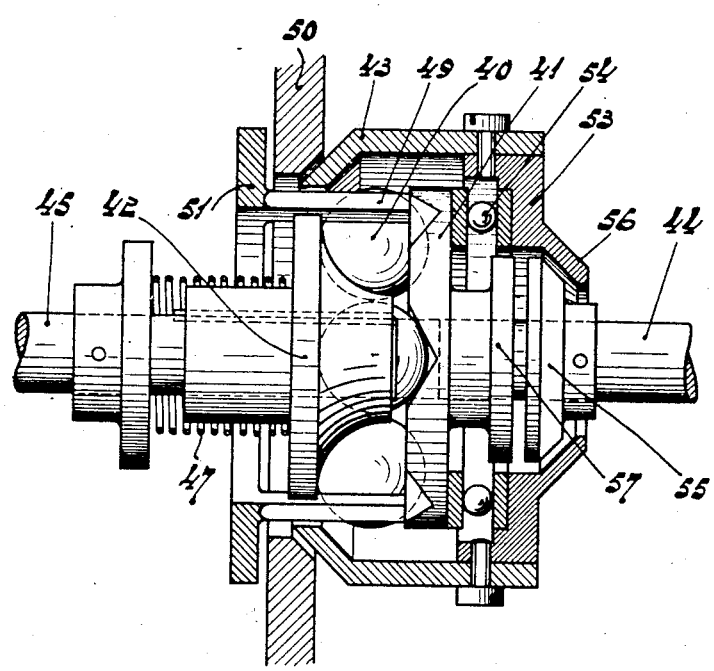

Fig. 26 illustrates, partly in vertical, longitudinal section, and partly in elevation still another form of the invention.

Figure 1:
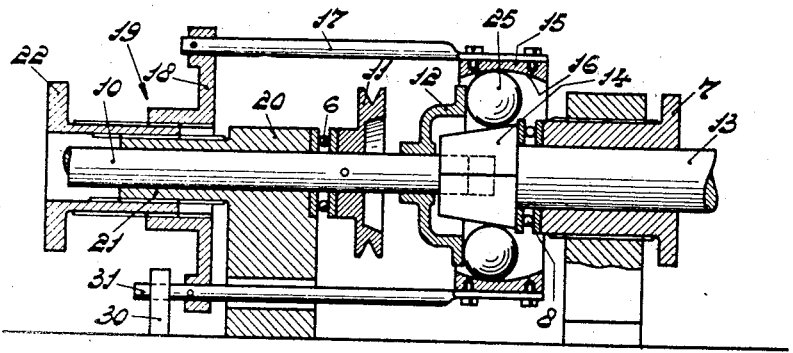
Fig. 1 is a vertical, longitudinal section through a device embodying my invention.
Figures 2, 3:
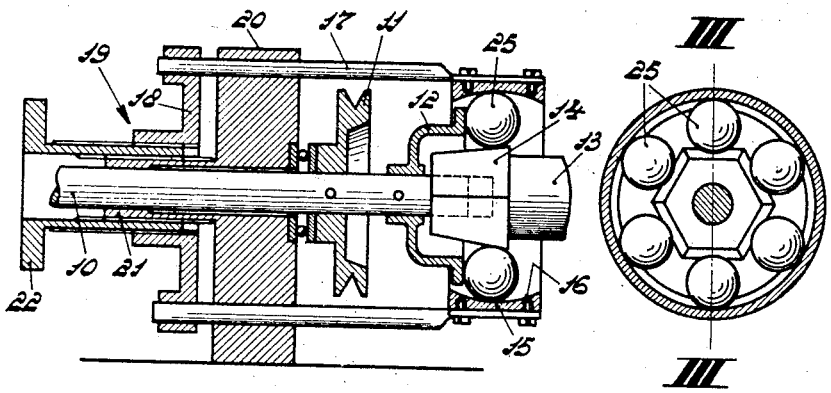
Fig. 2 is a transverse section through the ball race.
Fig. 3 is a slightly modified construction, the view being taken on the line III—III of Fig. 2.

Referring to Figs. 1 and 2 the transmission comprises a primary shaft 10 which is supported in a bearing 20 and on which a rope pulley 11 and a body 12 are fixed. A body 14 which is shaped as a pyramid (see Fig. 18) and coupled with the secondary shaft 13 is movably mounted at the right end of the shaft 10 by means of a bore. Furthermore a ring 15 having a spherical inner surface 16 is provided. This ring is attached to rods 17 mounted on a body 18, which by means of a differential screw construction 19 may be displaced relative to the bearing 20. To this end a projecting bushing 21 is mounted on the body, this bushing engaging with the bushing 22 which in its turn by means of screw threads may cooperate with the body 18. Between the pyramid 14, the body 12 and the ring 15 balls are clamped, these balls serving for the transmission of motion between the primary shaft 10 and the secondary shaft 13. By means of a ball bearing 8 the body 14 may receive an axial pressure. An axial adjustment of this body 14 is rendered possible by a threaded bush 7. By means of a ball bearing 6 the body 12 may receive an axial pressure.

In Figure 2 six balls 25 are shown serving for the transmission of motion. The principle of the invention will be explained by reference to Figures 4, 5 and 6 which are front views of a ball with surrounding surfaces. The surface of the body 12 cooperating with the ball is denoted by 27, and those of the bodies 15 and 14 by 16 and 26 respectively. These balls are permanently and operatively contacting with at least some of the surfaces with which they cooperate, and it is this relation which is meant when the term "continuously" is employed in the claims.

Figures 4, 5:
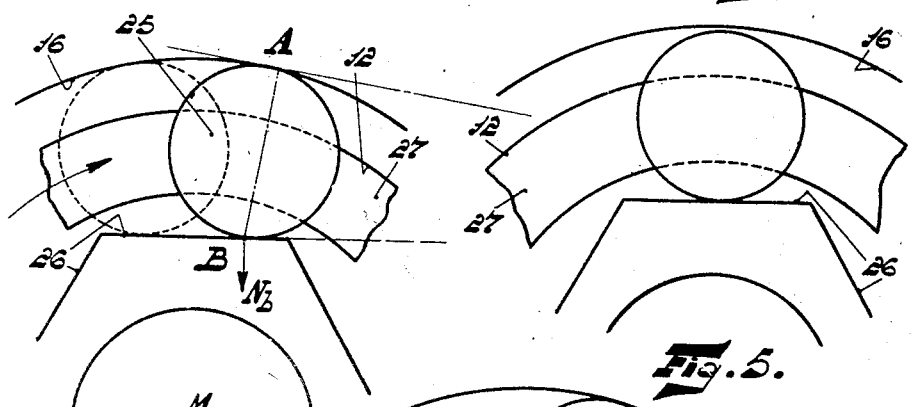

In Figure 5 the transmission is at rest. In this position the ball, if the surface 26 is supposed to be horizontal, will occupy a symmetrical position relative to this surface. If the primary shaft and consequently the body 12 begins to move in the direction of the arrow shown on Figure 4, the ball will be driven to the right by the surface 27 and seized between the surfaces 27, 16 and 26 which converge according to the direction in which the ball is driven due to the movement of the body 12, and consequently of the primary shaft. This convergence is represented by the tangents drawn in dotted lines in the points of contact A and B of the ball with the surfaces 16 and 26 (see Figure 4).

Figure 7:
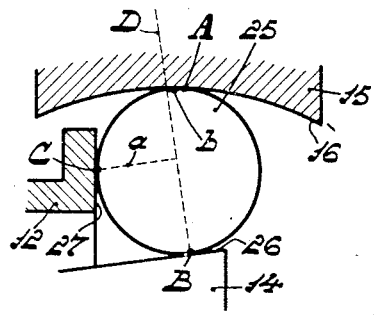
Figure 8:
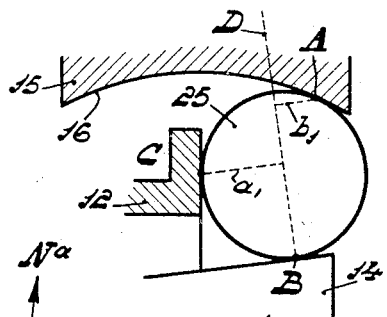

Figures 7 and 8 are side views of the ball, the latter occupying different positions relative to the surfaces 26, 27 and 16. By rotation of the body 12 and by friction at the point of contact of the ball 25 and the surface 27 a tangential force will be exerted perpendicularly to the plane of the drawing in the point C of Figure 7, so that the ball will begin to roll. This rolling cannot take place over the surface 26, since the ball would immediately jam on this movement. Due to this either a sliding movement or no movement will occur at the point of contact of the surface of the ball 25 with the surface 26. In consequence of the pressure exerted by the ball on the surface, sliding will require a large amount of energy, so that it may be assumed that the movements in the point B are extremely small and that the pole of the axis of rotation of the ball lies near this point, if not in it.

For a better understanding of the principle of the transmission the latter case will be taken for granted.

In Figure 7 and 8 the axis of rotation is denoted by D and the distance of the point C from this axis by $a$ and $a'$ respectively. Due to the tangential force in C a moment $Tc \times a$ will be exerted on the ball, this moment causing a rolling about the axis D. Since a rolling over the stationary surface 26 is not possible, a rolling over the stationary surface 16 will occur, due to which the ball jams and exerts a force on the pyramid, so that rotation is imparted to the latter. The point of contact of the ball with the surface 16 is denoted by A. In both Figures 7 and 8 the distances $b$ and $b'$ respectively of the point A from the axis of rotation D are indicated. It will be obvious that if losses due to friction are neglected the moment $Tc \times a$ must correspond to $Ta \times b$, and furthermore that the gear-ratio of the transmission is determined by the distances $a$ and $b$. When comparing Figure 7 with Figure 8 it will be obvious that a modification of the gear ratio may be obtained by displacing the body 15 relatively to the bodies 12 and 14.

Figure 9:
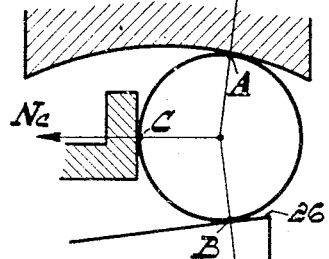

Due to the seizing of the balls 25 between the surfaces 16, 27 and 26 normal forces are exerted on these surfaces, as appears from Figure 9. Since the ball is in equilibrium a definite ratio will exist between the forces $Na$, $Nb$ and $Nc$. It is observed that said forces do not lie in one plane, as might be gathered from Figure 9; in reality their relation results from a parallelopiped of forces.

The force $Nb$ is also indicated on Figure 4.

Besides this force $Nb$, another tangential force will occur in B, which together with $Nb$ will exert a moment about the centre M of the transmission, (see Fig. 4), by which rotation is imparted to the pyramid 14. It will be obvious that this moment must be greater than the load of the secondary shaft, otherwise a rotation of the latter is not possible. Furthermore it will be obvious that due to the jamming of the ball, the forces occurring in B depend on the moment which must be exerted in order to surmount the secondary load. Indeed, if the load of the secondary shaft remains the same, an increase of these forces would result in a more rapid yielding of the pyramid and consequently in a decrease of the forces occurring in B and conversely. From this it results that the normal pressure in B, and consequently also the normal pressures in A and C exerted by the balls on the surfaces, depend on the load of the secondary shaft.

Figure 6:
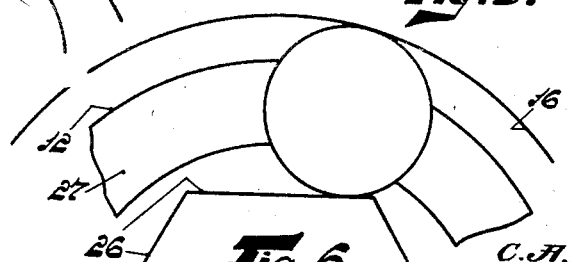
Figure 10:
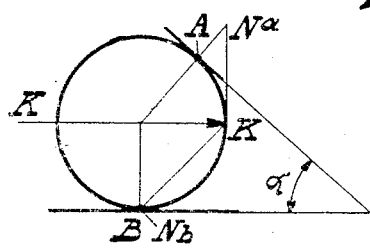
Figure 11:
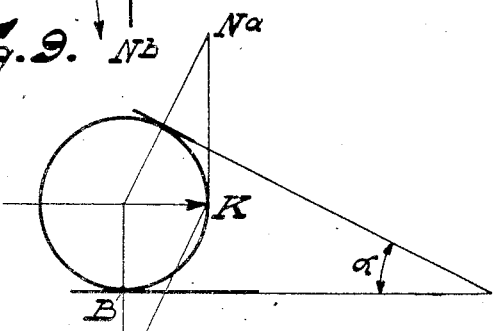

When comparing Fig. 4 and Fig. 6 the manner of changing the ratio between normal and tangential forces by displacing the pyramid 14 will be obvious. If in Figure 1 the pyramid is slightly moved to the right, the balls in Figure 2 will occupy a position relative to the surface of the pyramid (compare Figure 4 and Figure 6) which differs from the symmetrical position, so that the tangents in A and B in Figure 6 form an angle which is more obtuse than in Figure 4. In Figures 10 and 11 the cases of Figures 6 and 4 are reproduced. It is assumed that the force driving the ball in both cases in a clockwise direction has a value K. From the drawings it appears that in Figures 6 and 10 the normal forces will be much smaller than in Figure 4 and Figure 11. This explains why in the case of steady tangential forces the ratio between normal and tangential forces may be changed by displacing the pyramid. By a proper choice of the different dimensions and by an exact adjustment the normal pressures in A and C may be caused to be invariably about 10 times as great as the tangential forces occurring there, so that no sliding, but a mere rolling action occurs in these points. Furthermore a proper construction permits of establishing a substantially equal ratio between the normal pressures exerted on the surfaces of revolution 27 and 16 and that of the tangential forces.

Figure 4 shows the manner in which the ball 25 is driven between the surfaces 16 and 26. It has been found in practice that the ball sometimes abruptly recoils and jams in opposite direction between both surfaces (see position indicated in dotted lines) due to the movement of the surface 26 relative to the surface 16 which results in the transmission being abruptly seized. In order to prevent this a cage 36 is provided (see Figures 19 and 20), which embraces the balls and prevents one of the balls from recoiling. In order that the balls are always in contact with the surface 27 a slack spring 37 is provided.

A correct positioning and functioning of the balls according to the same gear-ratio is possible only if the surfaces 16 and 27 extend exactly concentrically relative to the axis of the pyramid 14, if the balls are all of exactly the same size, and if the surfaces of the pyramid 26 extend exactly symmetrically relative to the axis of the pyramid. Otherwise one ball will function according to a gear-ratio which is not in accordance with that of the other balls, so that slippage occurs. In order to avoid this drawback the body 15 being rendered self-adjusting, the construction of this body being shown in Figure 1. The rods 17 are mounted so as to be movable throughout their whole length relative to the bearing 20. In order that a free adjustment of the ring 15 is rendered possible but at the same time a rotation is avoided an abutment 30 is provided which cooperates with an extension 31 of the rod 17. The adjustment is not absolutely necessary, as appears from Figure 3 in which the same construction as shown in Figure 1 is represented without the ring 15 being self-adjusting.

Figure 12:
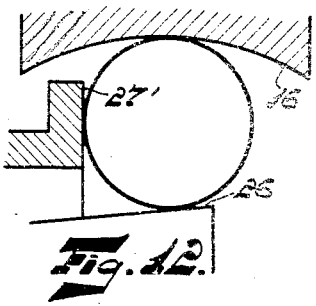
Figure 13:
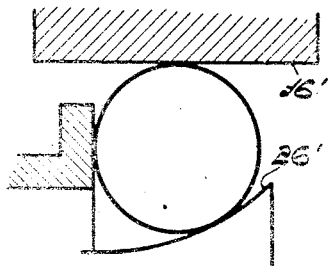
Figure 14:
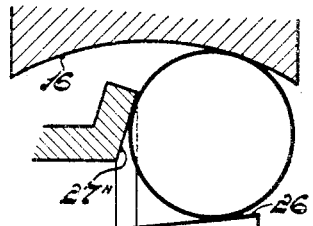
Figure 15:
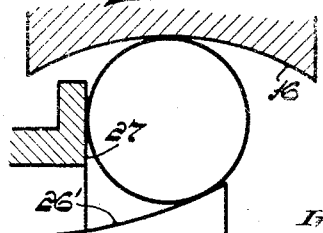

Finally the surfaces 16, 26 and 27 may differ from that shown in Figure 5. In Figure 12 for example, the surface 27' is a surface of revolution having a curved meridian. In Figure 14 the surface 27'' is a conical surface. In Figure 13 the surface 16' is a cylindrical surface, whilst the surface 26' is a curved surface. Figure 15 shows the combination of the surface 27 with the curved surfaces 26' and 16. It is observed that this surface 26' is not a surface of revolution but is constituted by a member such as shown in Figure 16. Figure 17 shows another form of construction of this member. Figure 18 shows the member 14 represented in Figure 1.

As stated hereinbefore, one advantage of the transmission according to the invention resides in the fact that the normal force depends on the load of the secondary shaft. This advantage is of particular importance because it permits constructing the transmission in such manner that it adjusts the gear-ratio automatically in accordance with the different load of the secondary shaft. Figure 21 is a side view of one form of construction thereof. Each of the balls 40 are clamped between three surfaces corresponding to the bodies 41, 42, 43. The body 41 is constituted by a disc which is fixed to the secondary shaft 44 and provided with grooves in the form of a V as shown in Figures 22 and 23. The body 43 is stationary and has a conical inner surface. By means of a key 46 the body 42 may move along the primary shaft 45. This body is pressed in the direction of the body 41 by a spring 47. If the primary shaft 45 begins to turn then this movement will be followed by the body 42.

The surface of the body 42 cooperating with the balls 40 is a surface of revolution having a circular generatrix whose radius differs very slightly from those of the balls. Due to this, a very small displacement of the body 42 results in a material displacement of the point of contact between the balls and the surface of rotation of the body 42, so that the sensitivity of the transmission is extremely great.

The transmission operates according to the same principle as that represented in Figure 1 so that further description may be dispensed with. It is observed, however, that in this case also, the movement of the body 42 results in jamming of the balls between an inclined surface of the grooves 63, the conical surface of the body 43, and the surface of revolution of the body 42. In this case also the ball, upon rolling, will be jammed between the bodies 41 and 43, and a rotation of the body 41 and of the secondary shaft will occur. When displacing the body 42 the point of contact between the surface of revolution of the body and the balls will be displaced, whereby another gear-ratio is produced. This gear-ratio will be greater as the body 42 is displaced more to the left. As stated before, the normal force exerted in this transmission by the balls on the surfaces depends on the load of the secondary shaft, so that a variation of this load results in a variation of the forces exerted by the balls on the body 42. Since the adjustment on the body 42 depends on the one hand of the spring 47 and on the other hand of the forces exerted by the balls on the body 42, the adjustment of this body will vary automatically in accordance with the load on the secondary shaft 44. If the load of the shaft 44 increases the forces exerted by the balls, 40 will likewise increase, which results in a displacement of the said body 42 to the left and consequently in a greater gear-ratio. Conversely, if the secondary load decreases and the body 42 is displaced to the right, then a situation may occur in which the body is displaced so far relative to the body 43 that the ball no longer bears against the surface of the latter but is clamped only between the bodies 42 and 41. In this case the ball is at rest so that serves as an intermediate body for direct transmission of motion from the primary to the secondary shaft. Since no friction occurs an efficiency of 100% is obtained.

If the balls are moved, then no rolling but sliding will occur on the bevelled surfaces of the grooves 63, whereby the efficiency of the transmission is unfavorably influenced. Figures 24 and 25 represent an embodiment in which the body 41 is replaced by a body 64 having rolls 65 which by means of ball bearings and pins 66 may rotate without any appreciable friction. Consequently the sliding friction has been transformed into rolling-friction, which highly contributes to the efficiency.

Finally Figure 26 represents a form of construction of the transmission as shown in Figure 21, which permits automatically adjusting, disengaging, and reversing the transmission of motion. By means of bars 49 a ring 51 is mounted on the body 41. The body 43 is provided with a ring 53. By means of the balls 40 on the one hand and the ball-bearing 54 on the other hand the body 43 is kept in its place relative to the body 41, so that a movement, for example in an axial direction, of the body 41 ensues. The ring 53 is provided with a conical surface 56 which may cooperate with the conical surface of the body 55 fixed to the secondary shaft. In addition the body 41 has attached to it a body 57 which may likewise cooperate with a surface of the body 55. Furthermore a ring 50 is provided which may be moved in an axial direction and by means of which the stopping and the axial displacement either of the ring 51 or of the body 43 may be effected. If the ring 50 is moved to the left and brought into contact with the ring 51 then the body 41 will be displaced to the left and stopped. At the same time the body 43 and the ring 53 will be displaced in the same direction, whilst the surface 56 will bear against the body 55. If the primary shaft starts turning then a movement in opposite direction of the body 43 and consequently of the shaft 44 will ensue.

If the ring 50 is moved to the right then the body 43 will be displaced to the right and jammed, which results in a similar displacement of the body 41, whilst the surface 56 and the body 55 will be moved away from each other. In addition the bodies 57 and 55 will bear against each other. Upon rotation of the primary shaft 45 the shaft 44 will move in the same direction. If the ring 50 occupies its middle-position, as shown in Figure 26, then the shafts 44 and 45 are disengaged. Both in the left position and in the right position of the ring 50 a transmission of motion and at the same time an automatic adjustment of the gear-ratio in accordance with the load of the secondary shaft ensues.

The movements performed by ring 50 and by the bodies 53 and 57 respectively in order to bring about a coupling or disengaging with the body 55 must be as small as possible. For a better understanding the distances between the surface 56, the body 55 and the body 57 shown on Figure 26 are somewhat exaggerated. In reality they are extremely small.

The transmission outlined above constitutes an enormous progress in the motor-car industry. Of course, however, the range of application is not limited thereto since it includes all fields of application where a regular transmission in the gear-ratio between two shafts and, if need, be, an automatic adjustment thereof in accordance with the secondary load is required.

What I claim is:

1. An adjustable gear ratio transmission, comprising a driving shaft and a driven shaft, an element comprising a surface of revolution connected to one of said shafts, an element connected to the other shaft and comprising a clamping surface which is not a surface of revolution, and a plurality of solids of revolution interposed between and cooperating with the surfaces of said elements, and another element, also comprising a surface of revolution, with which last-mentioned surface the said solids of revolution may also cooperate, the said solids contacting with the clamping surface and with the surface of at least one of the elements of revolution in planes tangent to said solids, and which planes continuously converge in the direction of relative motion of the said solids of revolution.

2. An adjustable gear ratio transmission, comprising a driving shaft and a driven shaft, and having a common axis of rotation, an element comprising a surface of rotation connected to one of said shafts, an element connected to the other shaft and comprising a clamping surface which is not a surface of revolution, a plurality of solids of revolution interposed between and cooperating with the surfaces of said elements, the said clamping element having its surface subdivided into a plurality of surfaces of revolution, each of the said last-mentioned surfaces of revolution being rotatable about an axis which cuts or crosses the axis of rotation of the transmission, and another element, also comprising a surface of revolution, with which surface the said solids of revolution may also cooperate, the said solids contacting with the clamping surface and with the surface of at least one of the other two elements in planes tangent to a solid, and which planes continuously converge in the direction of relative motion of the said solids of revolution.

3. A self adjusting variable gear ratio transmission, comprising a driving shaft and a driven shaft, means defining two surfaces, intermediate solids of revolution between said surfaces and with which said surfaces cooperate to transfer the motion of the driving shaft to the driven shaft, the said solids contacting with the said cooperating surfaces in planes tangent to said solids, and which planes continuously converge in the direction of relative motion of the said solids of revolution, at least one of the said cooperating surfaces being adjustable relative to the intermediate solids of revolution.

4. An adjustable gear ratio transmission, comprising a driving shaft and a driven shaft, an element comprising a surface of revolution connected to one of said shafts, an element connected to the other shaft and comprising a clamping surface, a plurality of solids of revolution interposed between and cooperating with the surfaces of said elements, and another element, also comprising a surface of revolution with which surface the said solids of revolution also cooperate, the said solids contacting with the clamping surface and with the surface of at least one of the elements of revolution in planes tangent to said solids, which planes continuously converge in the direction of relative motion of said solids of revolution, the surface of at least one of the said elements being adjustable relative to one of the other elements, the surfaces cooperating with the said solids being so shaped that upon adjusting the said adjustable surfaces it is possible to position the said solids of revolution so at least one of them is clamped only between the clamping surface and one of the surfaces of revolution and is out of contact with the other surface of revolution.

5. An adjustable gear ratio transmission, comprising a driving shaft and a driven shaft, a solid of revolution on one of said shafts, and a clamping surface on the other shaft, a plurality of solids of revolution enclosed between and cooperating with the surfaces of said elements, and another element also comprising a surface of revolution, with which surface the said solids of revolution may also cooperate, the said solids contacting with the clamping surface and with the surface of at least one of the elements of revolution in planes tangent to said solids and which planes continuously converge in the direction of relative motion of the said solids of revolution, the said surfaces of revolution directing the rotation of the said solids about an axis located in an axial plane of the entire transmission, whereby the ratio between the normal pressures on the surfaces of revolution invariably substantially corresponds to the ratio of the tangential forces.

6. An adjustable gear ratio transmission, comprising a driving shaft and a driven shaft, a plurality of solids of revolution, surfaces with which the said solids cooperate and between which the said solids are intermediate, the planes tangent to the said solids at their points of contact with at least two of the cooperating surfaces converging in the direction of relative motion of the said solids, one of the surfaces being adjustable, and means for exerting an external force on the said adjustable surface.

7. An adjustable gear ratio transmission, comprising a driving shaft and a driven shaft, a plurality of solids of revolution, surfaces with which the said solids cooperate and between which the said solids are intermediate, the planes tangent to the said solids at their points of contact with at least two of the cooperating surfaces converging in the direction of relative motion of the said solids, one of the surfaces being adjustable, means for exerting an external force on the said adjustable surface, and an engaging gear for coupling at least one of the cooperating surfaces alternatively with one of the driving shaft and driven shaft, or stationary body.

8. An adjustable gear ratio transmission, comprising a driving shaft and a driven shaft, an element comprising a surface of revolution connected to one of said shafts, an element connected to the other shaft, and comprising a clamping surface, a plurality of solids of revolution interposed between and cooperating with the surfaces of said element, and another element, also comprising a surface of revolution, with which surface the said solids of revolution may also cooperate, one of the said surfaces of revolution having a generatrix formed by a curve of curvature differing but slightly from that of the surface of the intermediate body cooperating therewith, the said solids contacting with the clamping surface and with the surface of revolution in planes tangent to said solids and which planes continuously converge in the direction of relative motion to the said solids of revolution.

9. A self adjustable variable gear ratio transmission, comprising a plurality of intermediate solids of revolution, for effecting the transmission of motion, a plurality of surfaces cooperating with the said solids of revolution, at least one of the said surfaces being self adjusting, whereby the planes tangent to a solid of revolution at the points of contact of the said solid with at least two of the cooperating surfaces converge in the direction in which the solid is driven by the primary shaft.

10. In a self adjusting variable gear ratio transmission, comprising a driving shaft and a driven shaft, an element comprising a surface of revolution connected to one of said shafts, an element connected to the other shaft and comprising a clamping surface which is not a surface of revolution, a plurality of solids of revolution interposed between and cooperating with the surfaces of said elements, the said solids contacting with the clamping surface and the surface of the element of revolution in planes tangent to said solids, and which planes continuously converge in the direction of rotation of said solids of revolution.

11. A self adjusting variable gear ratio transmission, comprising a driving shaft and a driven shaft, an element comprising a surface of revolution connected to one of said shafts, an element connected to the other shaft and comprising a clamping surface which is not a surface of revolution, a plurality of solids of revolution interposed between and cooperating with the surfaces of said elements, and another element having a surface with which the said solids of revolution may also cooperate, the said solids contacting with the clamping surface and with the surface of at least one of the other two said elements in planes tangent to said solids, and which planes continuously converge in the direction of relative motion of the two said last-mentioned elements.

12. An adjustable gear ratio transmission, comprising a driving shaft and a driven shaft, an element comprising a surface of revolution connected to one of said shafts, an element connected to the other shaft and comprising a clamping surface which is not a surface of revolution, and which is divided into a plurality of separate, longitudinally extending surfaces, and a plurality of solids of revolution interposed between and cooperating with the surfaces of said elements, the number of working surfaces of the clamping element being the same as the number of solids of revolution, the said solids of revolution contacting with the clamping surface and with said surface of revolution in planes tangent to said solids, and which planes continuously converge in the direction of relative motion of the said solids of revolution.

13. In an adjustable gear ratio transmission, a driving shaft and a driven shaft, an element comprising a surface of revolution, connected to one of said shafts, an element connected to the other shaft and comprising a clamping surface which is not a surface of revolution, a plurality of solids of revolution interposed between and cooperating with the surfaces of said elements, the said clamping element having its surface divided into a plurality of surfaces of revolution, the number of said surfaces being equal to the number of solids of revolution, the said solids contacting with the clamping surface and with the surface of the element of revolution in planes tangent to said solids, and which planes continuously converge in the direction of relative motion of the said solids of revolution.

14. An adjustable gear ratio transmission, comprising a driving shaft and a driven shaft, an element comprising a surface of revolution connected to one of said shafts and at least two other elements, one of which comprising a surface of revolution, the other comprising a clamping surface, one of said elements being connected to the other shaft, and a plurality of solids of revolution interposed between and cooperating with the surfaces of said elements, the said solids contacting permanently and operatively with the clamping surface and with the surface of at least one of the elements of revolution in planes tangent to said solids and which planes converge in the direction of relative motion of said solids of revolution.

15. An adjustable gear ratio transmission, comprising a driving shaft and a driven shaft, an element comprising a surface of revolution connected to the driving shaft, an element connected to the other shaft and comprising a clamping surface, a plurality of solids of revolution, interposed between and cooperating with the surfaces of said elements, and at least another element, also comprising a surface of revolution, with which the last mentioned surface, and the said solids of revolution may also cooperate, said solids contacting permanently and operatively with the clamping surface and with the surface of at least one of the elements of revolution in planes tangent to said solids and which planes converge in the direction of relative motion of said solids of revolution.

16. In a self adjusting variable gear ratio transmission, comprising a driving shaft and a driven shaft, elements connected to said shafts, at least one other element, one of said elements comprising a clamping surface, the other elements comprising surfaces of revolution, and a plurality of solids of revolution interposed between and cooperating with the surfaces of said elements, the said solids contacting with the clamping surface and at least one of the surfaces of revolution in planes tangent to said solids, and which planes continuously converge in the direction of rotation of said solids of revolution.

17. An adjustable gear ratio transmission, comprising a driving shaft and a driven shaft, an element comprising a surface of revolution connected to one of said shafts, at least two other elements, one of which is connected to the other shaft, one of said elements comprising a surface of revolution, the other comprising a clamping surface, and which is divided into a plurality of separate, longitudinally extending surfaces, and a plurality of solids of revolution interposed between and cooperating with the surfaces of said elements, the number of working surfaces of the clamping element being the same as the number of solids of revolution, the said solids of revolution contacting permanently and operatively with the clamping surface and with at least one of said surfaces of revolution in planes tangent to said solids, and which planes converge in the direction of relative motion of the said solids of revolution.

18. In an adjustable gear ratio transmission, a driving shaft and a driven shaft, an element comprising a surface of revolution, connected to one of said shafts, at least two other elements one of which is connected to the other shaft, one of said elements comprising a surface of revolution, the other comprising a clamping surface, and a plurality of solids of revolution interposed between and cooperating with the surfaces of said elements, the said clamping element having its surface divided into a plurality of surfaces of revolution, the number of said surfaces being equal to the number of solids of revolution, the said solids contacting permanently and operatively with the clamping surface and with at least one of the surfaces of revolution in planes tangent to said solids, and which planes converge in the direction of relative motion of the said solids of revolution.

19. An adjustable gear ratio transmission, comprising a driving shaft and a driven shaft, and having a common axis of rotation, an element comprising a surface of rotation connected to one of said shafts, at least two other elements one of which is connected to the other shaft, one of said elements comprising a surface of revolution, the other comprising a clamping surface, and a plurality of solids of revolution interposed between and cooperating with the surfaces of said elements, the said clamping element having its surface subdivided into a plurality of surfaces of revolution, each of the said last mentioned surfaces of revolution being rotatable about an axis which cuts or crosses the axis of rotation of the transmission, the said solids contacting permanently and operatively with the clamping surface and with the surface of at least one of the other two elements in planes tangent to a solid and which planes converge in the direction of relative motion of the said solids of revolution.

20. An adjustable gear ratio transmission, comprising a driving shaft and a driven shaft, a plurality of solids of revolution, means defining surfaces with which the said solids cooperate and with at least two of which surfaces said solids are permanently and operatively contacting and between which the said solids are intermediate, the planes tangent to the said solids at their points of contact with at least two of the cooperating surfaces converging in the direction of relative motion of the said solids, one of the surfaces being adjustable, and means for exerting an external force on the said adjustable surface.

21. A self adjusting variable gear ratio transmission, comprising a driving shaft and a driven shaft, means defining two surfaces of revolution and another surface, intermediate solids of revolution between said surfaces and with which at least two of said surfaces cooperate to transfer the motion of the driving shaft to the driven shaft, the said solids being in permanent and operative contact with the said cooperating surfaces in planes tangent to said solids, and which planes converge in the direction of relative motion of the said solids of revolution, at least one of the said surfaces being adjustable relative to the intermediate solids of revolution, and means for exerting an external force on the said adjustable surface.

22. A self adjustable variable gear ratio transmission, comprising a plurality of intermediate solids of revolution, for effecting the transmission of motion, a plurality of surfaces cooperating with the said solids of revolution, at least one of the said surfaces being self adjusting, whereby the planes tangent to a solid of revolution at the points of contact of the said solid with at least two of the cooperating surfaces converge in the direction in which the solid is driven by the primary shaft.

23. A self adjustable variable gear ratio transmission, comprising a driving shaft and a driven shaft, a plurality of solids of revolution, surfaces with which the said solids cooperate and between which the said solids are intermediate, the planes tangent to the said solids at their points of contact with at least two of the cooperating surfaces converging in the direction of relative motion of the said solids, one of the surfaces being adjustable, means for exerting an external force on the said adjustable surface, and an engaging gear for coupling at least one of the cooperating surfaces alternatively with one of the driving shaft and driven shaft, or stationary body.

24. An adjustable gear ratio transmission, comprising a driving shaft and a driven shaft, an element comprising a surface of revolution connected to one of said shafts, at least two other elements one of which is connected to the other shaft, one of said elements comprising a clamping surface, the other comprising a surface of revolution, a plurality of solids of revolution interposed between and cooperating with the surfaces of said elements, the said solids contacting permanently and operatively with the clamping surface and with the surface of at least one of the elements of revolution in planes tangent to said solids, which planes converge in the direction of relative motion of said solids of revolution, the surface of at least one of the said elements being adjustable relative to one of the other elements, the surfaces cooperating with the said solids being so shaped that upon adjusting the said adjustable surfaces it is possible to position the said solids of revolution so that they are clamped only between the clamping surface and one of the surfaces of revolution, and no longer react against the other element.

25. A self adjusting variable gear ratio transmission, comprising a driving shaft and a driven shaft, an element comprising a surface of revolution connected to one of said shafts, at least two other elements one of which is connected to the other shaft, one of said elements comprising a clamping surface, the other comprising a surface of revolution, a plurality of solids of revolution interposed between and cooperating with the surfaces of said elements, the said solids contacting permanently and operatively with the clamping surface and with the surface of at least one of the elements of revolution in planes tangent to said solids, which planes converge in the direction of relative motion of said solids of revolution, the surface of at least one of the said elements being self adjusting relative to one of the other elements according to the load of the driven shaft against the action of an external force, the surface cooperating with the said solids being so shaped that upon the adjusting of the said surface it is possible to position the said solids of revolution, so that they are clamped only between the clamping surface and one of the surfaces of revolution, and no longer react against the other elements.

26. An adjustable gear ratio transmission, comprising a driving shaft and a driven shaft, an element comprising a surface of revolution connected to one of said shafts, at least two other elements one of which is connected to the other shaft, one of said elements comprising a clamping surface, the other comprising a surface of revolution, a plurality of solids of revolution interposed between and cooperating with the surfaces of said element, one of the said surfaces of revolution having a generatrix formed by a curve of curvature differing but slightly from that of the surface of the intermediate body cooperating therewith, the said solids contacting permanently and operatively with the clamping surface and with the surface of revolution in planes tangent to said solids and which planes converge in the direction of relative motion to the said solids of revolution.

27. An adjustable gear ratio transmission, comprising a driving shaft and a driven shaft, an element comprising a surface of revolution on one of said shafts, at least two other elements one of which is connected to the other shaft, one of said elements comprising a clamping surface, the other comprising a surface of revolution, a plurality of solids of revolution, enclosed between and cooperating with the surfaces of said elements, the said solids contacting permanently and operatively with the clamping surface and with the surface of at least one of the elements of revolution in planes tangent to said solids and which planes converge in the direction of relative motion of the said solids of revolution, the said surfaces of revolution directing the rotation of the said solids about an axis located in an axial plane of the entire transmission whereby the ratio between the normal pressures on the surfaces of revolution invariably substantially corresponds to the ratio of the tangential forces.

28. An adjustable gear ratio transmission between two shafts, comprising a plurality of intermediate solids of revolution for the transmission of motion, a plurality of surfaces with at least two of which the said solids cooperate in permanent and operative contact, the planes tangent to an intermediate solid at the point of contact of the said solid to at least two of the said surfaces converging in the direction in which the body is driven by the primary shaft, and a cage housing the said intermediate bodies.

29. An adjustable gear ratio transmission between two shafts, comprising a plurality of intermediate balls for effecting the transmission of motion, and a plurality of means defining surfaces with which the said balls cooperate in permanent and operative contact, the planes tangent to a ball at the points of contact of the said ball with at least two of the cooperating surfaces converging in the direction with which the ball is driven by the primary shaft.

In testimony whereof I have signed my name to this specification.

CORNELIS ANDRIES HEERO MULDER.